Oct. 28, 1930.   H. L. ADAMS   1,780,104
PARACHUTE AND PACK THEREFOR
Filed Oct. 1, 1917   7 Sheets-Sheet 4
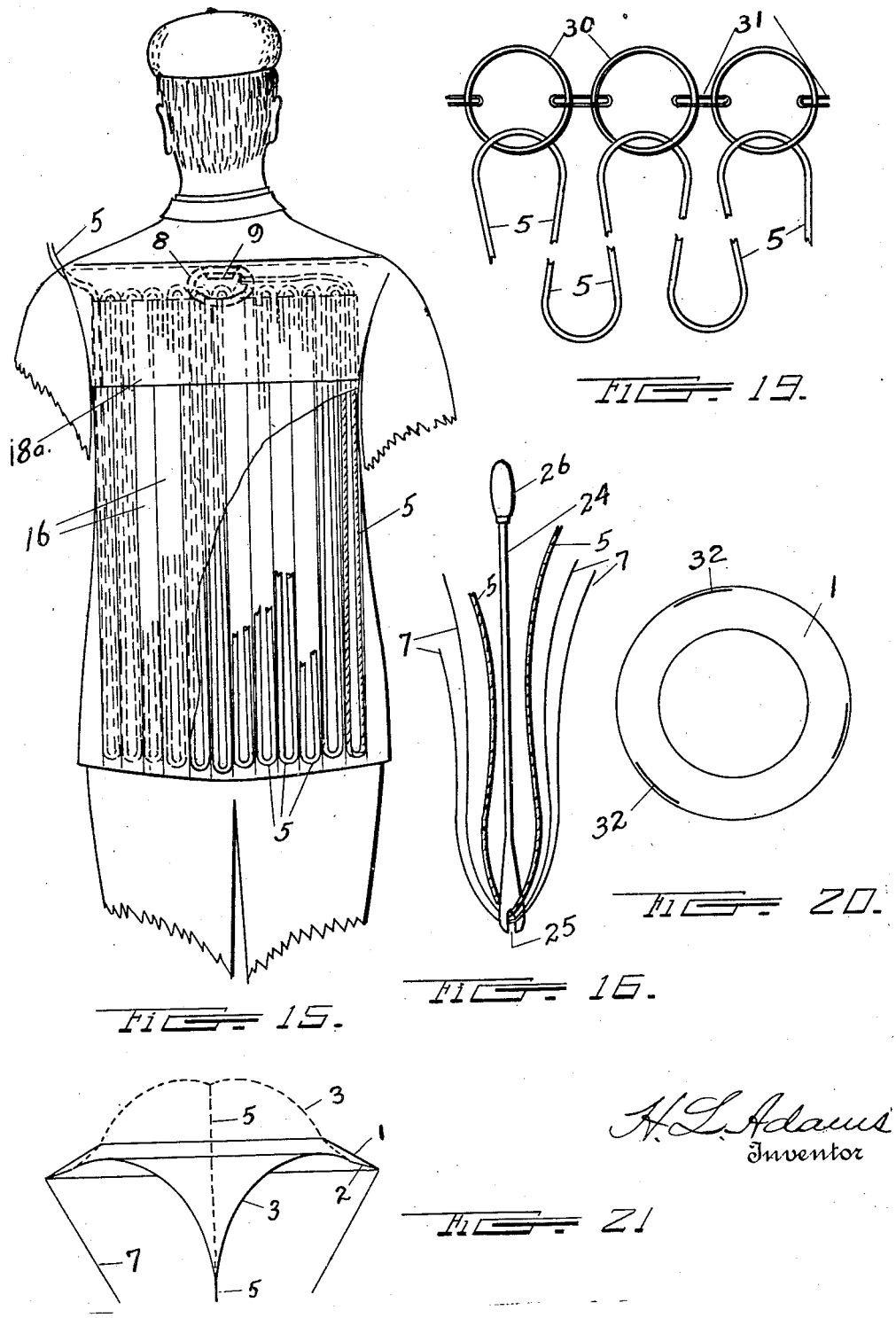

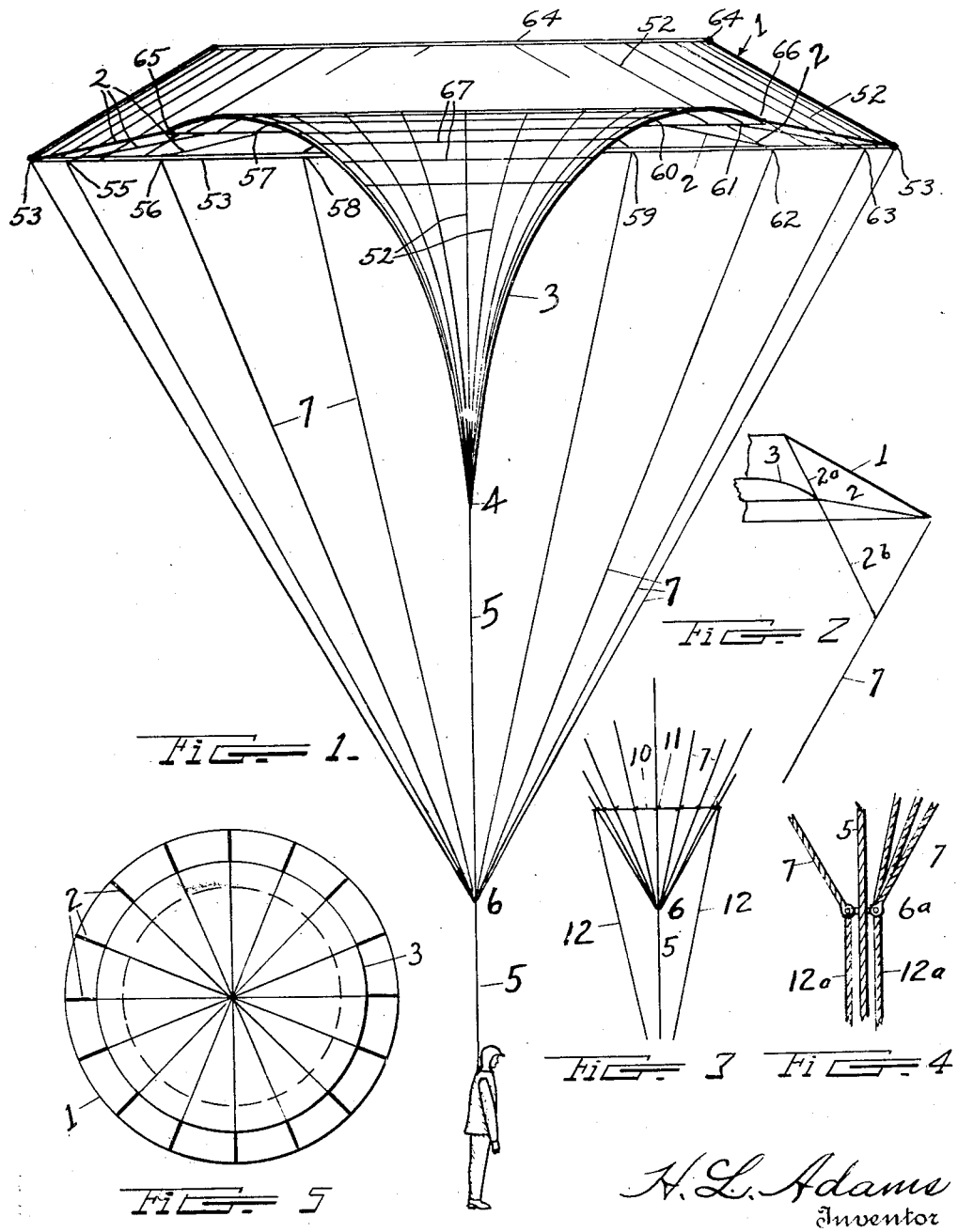

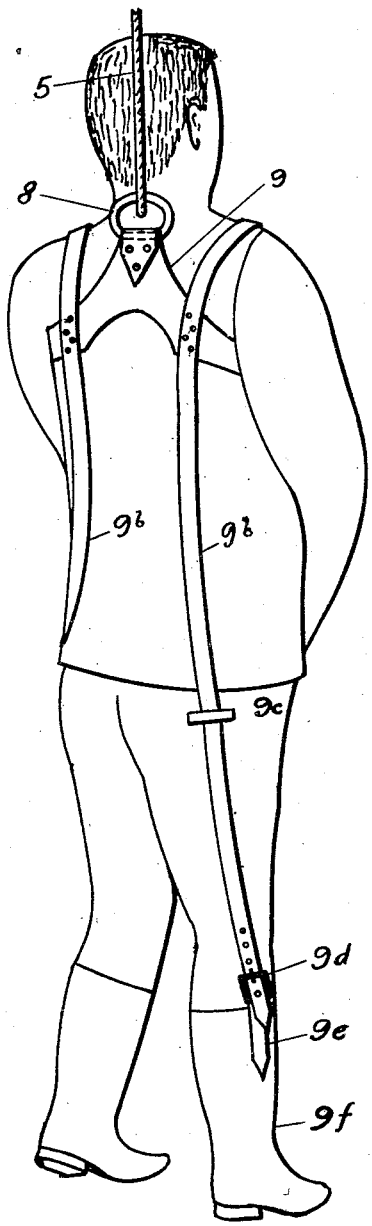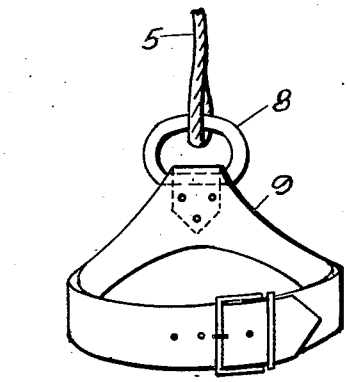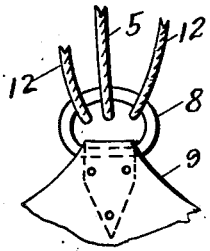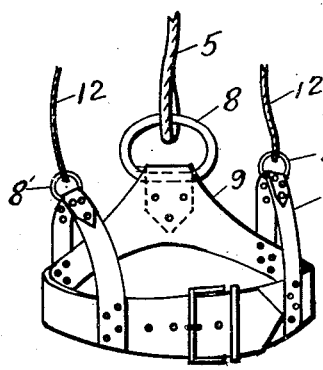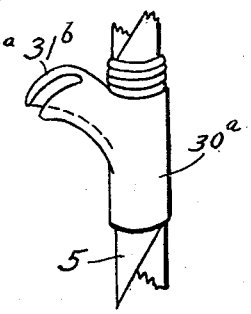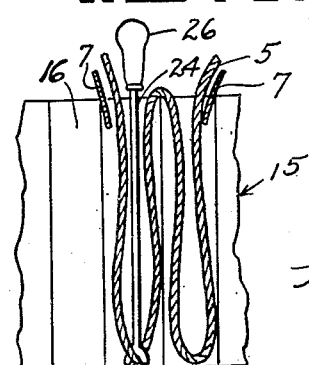

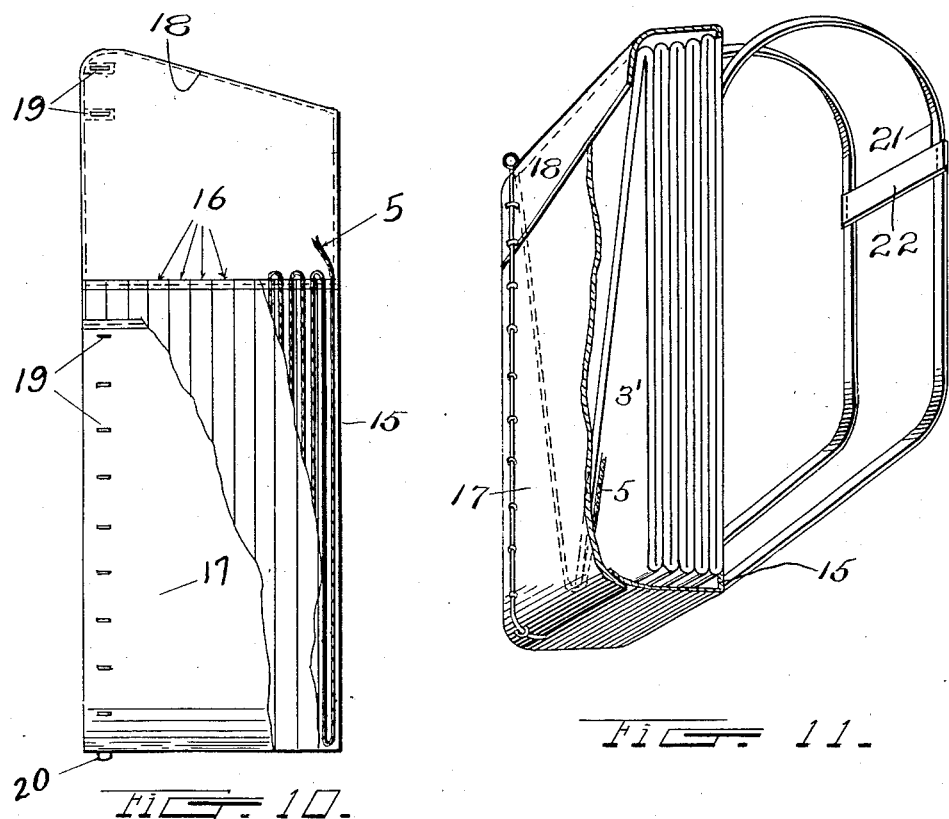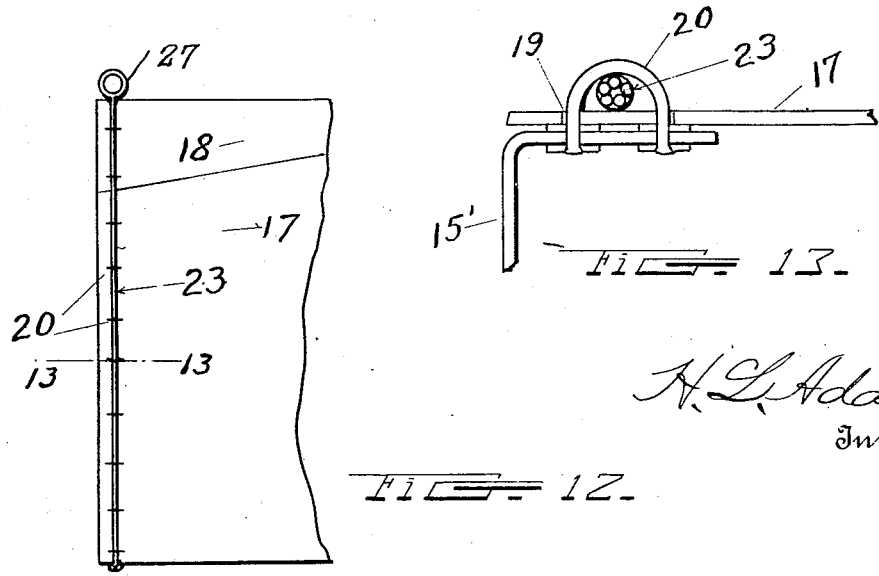

Oct. 28, 1930. H. L. ADAMS 1,780,104
PARACHUTE AND PACK THEREFOR
Filed Oct. 1, 1917 7 Sheets-Sheet 5

INVENTOR.
H. L. Adams

Oct. 28, 1930.  H. L. ADAMS  1,780,104
PARACHUTE AND PACK THEREFOR
Filed Oct. 1, 1917  7 Sheets-Sheet 6
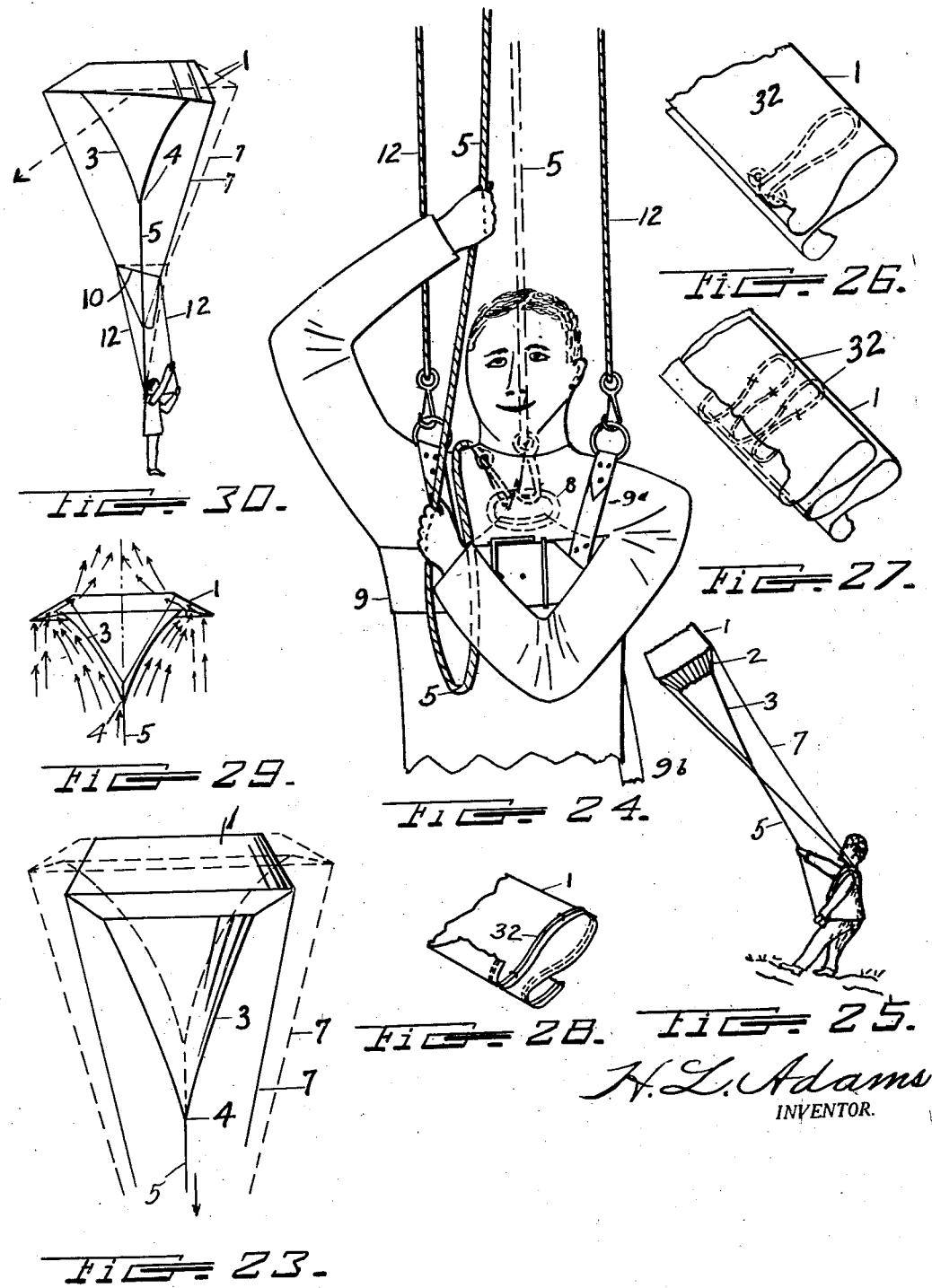

Oct. 28, 1930.  H. L. ADAMS  1,780,104
PARACHUTE AND PACK THEREFOR
Filed Oct. 1, 1917   7 Sheets-Sheet 7
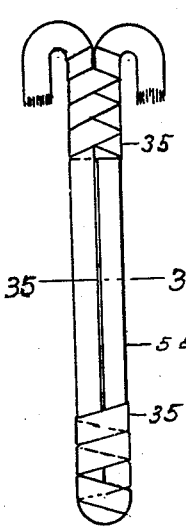
FIG. 34.
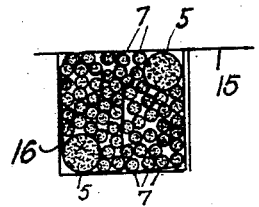
FIG. 35.
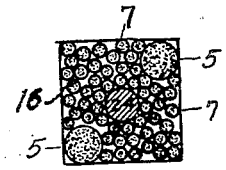
FIG. 36.
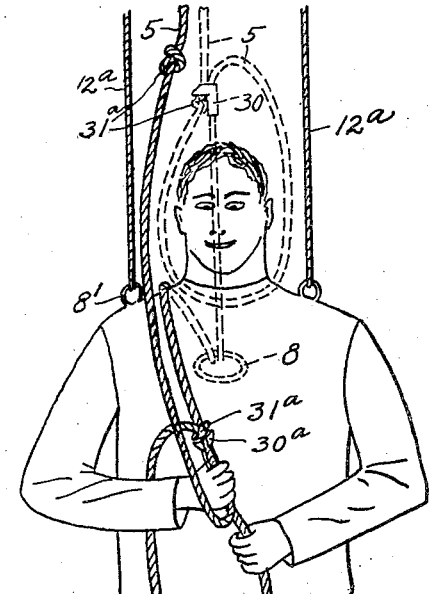
FIG. 31.
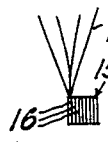
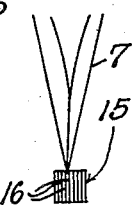
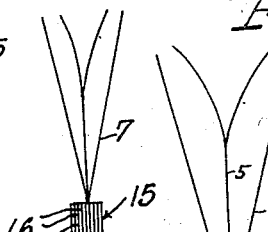
FIG. 37.
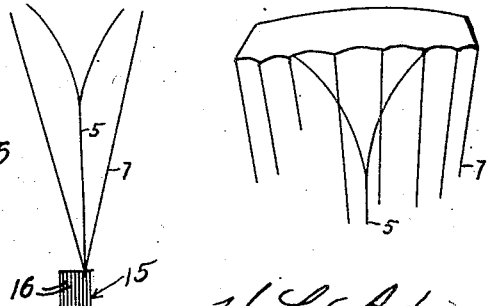
H. L. Adams
INVENTOR.

Patented Oct. 28, 1930

1,780,104

UNITED STATES PATENT OFFICE

HERBERT L. ADAMS, OF WASHINGTON, DISTRICT OF COLUMBIA, ASSIGNORS TO IRVING AIR CHUTE CO., INC., OF BUFFALO, NEW YORK, A CORPORATION OF NEW YORK

PARACHUTE AND PACK THEREFOR

Application filed October 1, 1917. Serial No. 194,287.

My invention relates in general to parachutes and is more particularly concerned with improvements in parachutes of the type adapted to be worn on the person of the aviator.

It is an object of my invention to provide an improved parachute pack or container of flexible material for housing my parachute when in folded condition and suitable harness for comfortably securing the pack to the person of the aviator.

It is another object of my invention to provide an improved means for holding my pack closed, together with novel means for releasing said holding means to open the said pack when it is desired to put the parachute into operation.

A further object of my invention is to provide novel means in my container for spacing the shroud lines while my parachute is folded in condition in such a manner as to insure against entanglement while permitting ready release thereof when the parachute is released from the pack.

A further object of my invention is to provide a novel type of parachute which opens quickly, which is non-oscillating, and which may be controlled during descent, not only as to rate of descent, but to a certain degree at least, as to direction.

Still another object of my invention is to provide novel and improved adjustable harness means especially constructed to permit the strain and shock upon the parachutist, incident to the opening of the parachute, to be taken up by those portions of his body best adapted to withstand such shock.

It is another object of my invention to provide a parachute, all of the members of which are in tension while under load.

A still further object is to provide a safer way of keeping the delicate parachute in a flexible protective container until all danger of tearing the parachute on the air craft, and projections or latches, catches, etc., of the case or container of the parachute or any parts thereof that may be attached to an aircraft is past. As the aviator and aircraft are most liable to separate very rapidly once they are apart, therefore the container should not be attached to the aircraft and open in the danger zone but should only be opened when it can be done safely. The opening may be performed either manually or automatically, preferably manually for experienced aviators and automatically for inexperienced people that may lose their heads in emergencies. The automatic releasing means of the container can be so designed that if the aviator dives out head first, it will right him before releasing the container. Diving out is the quickest way to leave if a gas fire makes quick leaving necessary, or if near the ground when trouble comes. It is intended that the spring in the outer ring of the parachute canopy shall be used to aid in freeing the canopy from the container, the instant the container is released.

A still further object is to stow the connecting lines in such a way that they will be restrained from becoming tangled either by hard usage while in the pack or after the release thereof, thereby endangering the successful use of the parachute when needed. The release of the lines and canopy can be systematically and automatically arranged, to leave a pack, sack, pouch, pocket, garment, etc. safely. It is intended that pack shall be used for a cushion and in that way will have hard usage and to be comfortable it should be shallow as well as flexible.

A still further object is to provide a new type of parachute that opens at once and is not subject to the danger of collapsing by oscillating.

A still further object is to provide a harness having means to transmit shock incident to the opening of the parachute to the lower part of the body, in part at least. If the body is not vertical on opening of chute a strain on the harness in the upper part will right it. The intention is to arrange the harness so that heavy strains incident to opening of the chutes and support of the body will be transmitted simply as possible to the lower part of the body best adapted to receive them. The harness is so constructed that it may be taken up or let out to fit the individual. It will not interfere with walking, as the straps will slip back and forward over the shoulders.

The harness and parachute may be left in the aircraft and can be adjusted to different passengers or users, who if the harness extended to the feet would only have to be provided with regular or special foot covering having attachments. This apparatus is especially applicable to lady aviators, as it can be used with dresses, and saves some hard strains on the more delicate upper parts of the body. It may be used over an overcoat with a special back strap at the hips or seat and a special foot and leg covering for the casual passenger. In descent it furnishes a way to take the weight of the upper part of the body especially away from under the arm pits and carry nearly all of it on either the seat or feet or on both in long descents. This is where the weight of the body is more naturally carried. It has but few parts to get in the way when not in use. This harness may likewise be used over a one piece aviator's suit and slipped on or off by means of a single point of attachment or release over the chest, the harness remaining with the suit. The suit may have means of securing the harness to it permanently if desired, but it is not necessary. The connection of harness to the body on the lower part is made near the knees and hips, to keep it in place when the knee and hip joints are bent. It is easy to get out of the harness quickly. In the detachable harness the aviator can unbuckle the straps to the boots while in descent and then unbuckle the chest straps when about to land, and thereby slip out of the harness to prevent being dragged on the ground after landing.

If the harness is attached to the suit securely in part at least the collapsing means of the parachute can be used to prevent being dragged.

A still further object is to provide an apparatus with all stresses which hold the parachute in its extended position are in tension thereby eliminating the bulky or flexible parts of the umbrella type that may tear the fabric or injure the party using it, but mainly the weight is reduced by eliminating struts or members in compression or bending stresses. This is accomplished by the design and construction as shown. In long distances compression members would have to be quite large to be as effective as the ribs in an umbrella, adding much needless weight which is hereby avoided in this design. As shown in Fig. 11 the parachute is folded in the pack peak out or up, and will issue peak first to be caught by the air and start unfolding. Fig. 11 shows a standard type of chute folded in the pack for purposes of illustration obviously that or any other flexible type of chute could be used, as the pack is intended for universal use. The wires 32 and 32ª sewn in the outer part farthest from the peak are therefore at the bottom of pack and as the releasing means operates the springs 32 and 32ª start unfolding, driving the chute before them from the pack.

Other objects of my invention will appear in the following part of the specification and claims and as disclosed in the accompanying drawings in which:—

Figure 1 is a central vertical section of my two part parachute canopy and lines in use in descent.

Figure 2 is a detail of a modification of my lines for holding the inner and outer parachute parts in place.

Figure 3 is a detail showing a modification of my means for connecting the shroud lines to the wearer.

Figure 4 is a detail of my control line arrangement.

Figure 5 is a bottom plan view of the open parachute showing detail of connecting line arrangement between inner and outer canopies.

Figures 6, 7 and 8 are details of various modifications of my harness arrangement.

Figure 9 shows my harness arrangement as applied to the person of the parachutist.

Figure 10 is a detail in elevation with portions broken away, showing my parachute pack and shroud line pockets.

Figure 11 is perspective of my parachute pack assembled with a parachute folded therein, portions being broken away for purposes of illustration.

Figures 12 and 13 are details showing my means for holding the parachute pack assembled and disclosing my release means.

Figure 15 is a modification showing my shroud line spacing means as formed in the clothing of the parachutist when it is desired to dispense with a separable pack.

Figure 16 is a detail showing my shroud line packing tool and the method of packing the shroud lines.

Figure 18:
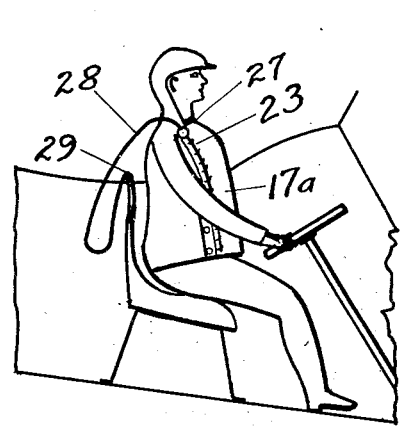

Figure 18 discloses a modification of my device in which the quick release mechanism is attached to the aircraft.

Figure 19 is a modification of my shroud line spacing means.

Figure 20 is a modification of my canopy structure illustrating spring opening means.

Figure 21 is a view similar to Figure 1 illustrating my inner parachute canopy in a position approximating its upmost position.

Figure 22:
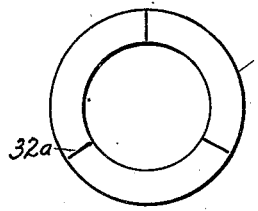

Figure 22 is a modification of Figure 20.

Figure 23 is an elevation of my parachute and illustrates means of controlling the rate of descent.

Figure 24 is a detail showing method of the control shown in Figures 23 and 30.

Figure 25 discloses the method of controlling the parachute after landing.

Figures 26, 27, and 28 are details showing modifications of the methods of positioning and folding the skirt of the outer canopy and the quick opening springs.

Figure 29 is a diagram of the path of the air flow between my inner and outer canopies to prevent oscillation thereof.

Figure 30 is a detail of my control cord arrangement.

Figure 31 is a detail of one of my control cord arrangements.

Figure 32 is a detail of my control cord foreshortening holder.

Figure 33 is a further detail of the method of packing my shroud lines in their spacing pockets.

Figure 34 is a detail illustrating a modified method of preventing entanglement of one of my shroud line loops.

Figures 35 and 36 are cross sections of the lines arranged as in their pockets, Figure 36 showing also the tool 24.

Figure 37 shows the progressive stages of egress of the lines from their pockets.

Referring now with greater particularity to the drawings it will be seen that my device is comprised as follows:

My parachute canopy is comprised, primarily, of two parts an outer annular ring shaped portion 1, which, when completely expanded, takes a form approximating that of the lateral surface of the frustum of a cone; and an inner substantially conical portion 3. As illustrated in Figure 1 these two canopy members are held together by lines 2 secured to the base of both members and of a length less than the length of the generatrix of the frustum of the cone. The apex 4 of the conical canopy 3 is connected to a line 5 leading to the aviator, and may or may not be connected to the shroud or supporting lines, as at 6, in such a manner as to hold the cone substantially inverted. In the structure shown in Figure 4 the shroud lines or supporting lines 7, secured to the skirt of the member 1, and extending to the upper extremity thereof, are, at their lower ends, secured to a concentrating ring $6^a$ permitting the line 5 to be freely movable relative thereto to vary the conformation of the canopy 3 and the amount of gap or vent between members 1 and 3. When the chute is folded up great care must be used to see that surface 3 is folded securely inside surface 1, and in order, leaving no openings until the air gets under the outer surface pulling it out, if quick action is desired which would rarely be known beforehand, in emergency use. If a long drop is to be made before the chute is to be opened, or if only high flying is to be considered the chute may be packed with surface 1, extended beyond surface 3, in this way the shock to aviator on opening the chute will be reduced to practically nothing and can be extended over as long a period as desired by paying out line 5" slowly, gradually reducing the speed to normal. The tighter surface 1 can be kept against the base of surface 3, the greater will be the increase in speed of opening, which is a very desirable factor. Line 5 should be carefully adjusted to give maximum opening speed. Descending speed can be taken care of later by operating line 5 as desired.

Figure 17:
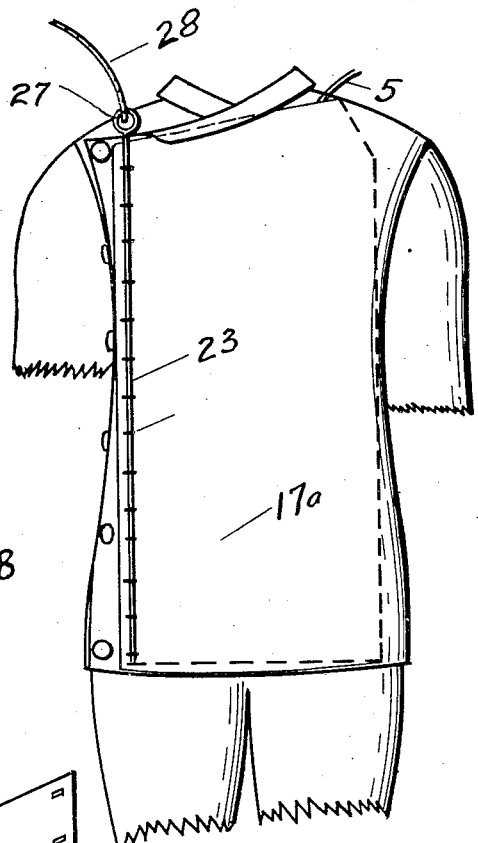
Figure 17 is a further detail of the type of pack as disclosed in Figure 15.
Figure 14:
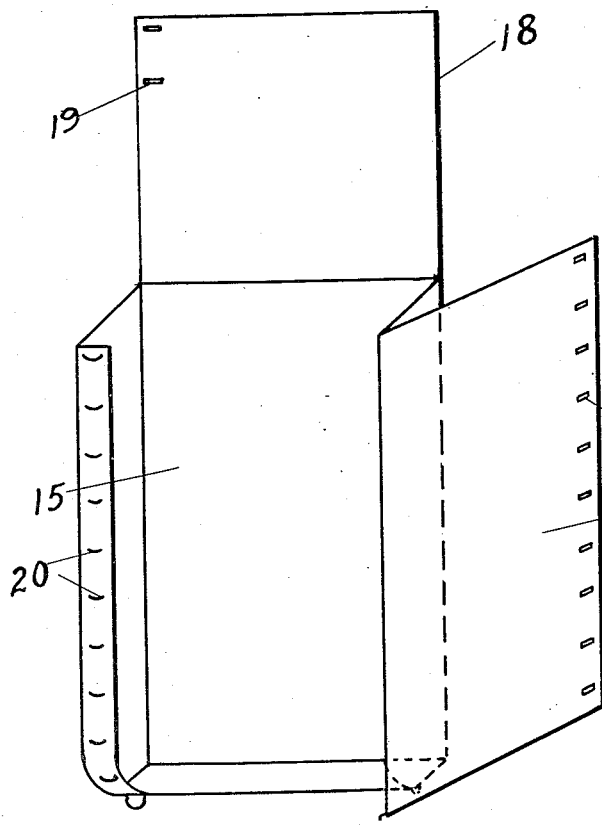
Figure 14 shows my pack opened ready to receive the folded parachute, the shroud line pockets not being illustrated.

The springs 32 or $32^a$, see Figures 20 and 17 respectively, near the outer part of canopy or where desired are provided to make it open quickly, but obviously they will cause the chute to issue from the pack quickly. Care must be taken to fold these springs properly to perform both of the function of ejecting and opening. Suitable concentration lines $12^a$ for the smaller and more numerous shroud lines 7 are provided to secure the load or concentrating ring $6^a$ to the harness of any of the types disclosed, or not, as desired.

In the modifications shown in Figures 2 and 3 the upper ends of the shroud line 7 are secured as in Figure 1 to the skirt of the canopy and the lines $2^a$, for securing the members 1 and 3 together, are still employed, but either or both of two additional lines $2^a$ and $2^b$, may be provided. The lines $2^a$ connect the periphery of the skirt of canopy 3 with the peak or a point adjacent to the peak of the canopy 1 while lines $2^b$ connect the skirt of the canopy 3 to the shroud lines 7 at a point below the skirt of the canopy 1. Lines 2, $2^a$ and $2^b$ thus serve to fix the position of the periphery of the skirt of the canopy 3 in relation to the peripheries of the skirt and peak of the canopy 1. Adjacent to their lower ends, as may be seen by reference to Figure 3, the shroud lines 7 may be secured at 11 to a larger load ring 10 which, in turn is connected by supporting lines 12 to load rings 8 or 8' of the harness 9, as shown in Figures 7 and 8. A pull on one of the ropes 12 or $12^a$ will result in varying the inclination of the canopy to the vertical and will give dirigibility to the parachute and enable an effective venting of air therefrom.

In Figure 9 I have disclosed the harness as having the load ring 8, the main belt 9 passing around the aviator's body and straps $9^b$ passing through straps $9^c$ adjustably connected at $9^d$ to the buckle $9^e$ of the parachutist's boot $9^f$. Figure 8 discloses a modification of the belt portion 9 having shoulder straps $9^a$ and rings 8' for securing the lines 12. Straps $9^c$ are located near the hip so that the bending of the body at the hips will not produce a slackness in line $9^b$. They are at the back of the hips near the side, and with the legs bent will hold the harness so as to assist in taking the shock in opening the parachute, and take a part of the weight from the feet. The connection at 9ᵈ is secured to the leg near the knee so that the bending of the body will not undesirably lengthen the harness. When the body is bent at the hips the harness 9ᵇ passing through 9ᶜ will assume an angular shape, which otherwise would tend to straighten and be apt to foul the wearer. The connection 9ᶜ also assists in transmitting strain and weight of the body to the seat of the wearer; a minor part of the weight being upon the feet when the user is in seated posture during descent.

In Figures 10 to 14, inclusive, I have disclosed a form of parachute pack or container. Fig. 11 shows a standard type parachute folded in the pack for the purpose of illustration, but obviously any type could be folded in the pack. The pack is comprised of a sheet of flexible material such as fabric, and has a substantially rectangular central or back portion 15 and closure flaps secured thereto and extending therefrom to give to the whole a substantially cruciform pattern. These flaps are adapted to be wrapped about the folded parachute, one of the flaps 15′ has transversely apertured studs or staples 20 secured thereto, adapted to be extended through eyelets 19 in the other flaps, 17 and 18. Figures 10 and 11 show a flap 18 cut on a bias angle to keep it in shape, and hold it down tight without two sets of releasing means one on each side of the back. In a square edge flap the loose edge would be apt to curl undesirably.

A release rope, cord or pin 23 of small diametered flexible wire, or the like, is adapted to be extended through the staples 20 to hold the parachute pack in closed position, though it is adapted to be readily and easily withdrawable therefrom by a tug on a line or rope 28 secured to the handle ring 27 at its upper end, the line or rope being operated either manually or by a line or rope attached to the aircraft as is shown in Figure 18 at 29. The straps 21, 22 are so arranged that the pack can be detachably worn on either the back or the chest of the aviator.

In the central rectangular portion of the pack I have formed a series of parallel pockets for spacing and thereby preventing entangling of the bundles of shroud lines 7. In Figure 10 I have illustrated the single line 5 as folded zig zag in loops in these pockets though it will be obvious from Figures 16, 33 and 34 that all the shroud lines are so folded, and stored either with or without the additional precaution of wrapping the same with paper as shown in Figure 34. It will be noted that these lines when coiled line a plane parallel with the back of the pack and will issue successively from the spacing pockets.

When one of the shrouds 7 is pulled directly or indirectly it straightens the surface 1 decreasing its resistance to the line of movement. This decreased resistance in surface 1 is transmitted to surface 3 by line 2 and as the opposite side of surface 1 has the same pull as before practically, the central part will move until it equalizes the forces holding it in place. As surface straightens it also leaves a larger opening between the two surfaces at the place the shrouds are shortened. For the central cone would naturally collapse if not held extended by a pull on lines 2, due to the resistance of the air against it, and as the surface 1 straightens the pull on line 2 is less from surface 1. The surface 3 leaves surface 1 and a larger volume of air passes at that point and a smaller amount of air will pass on the opposite side of the circumference of the chute. This caused an eccentric spill of air on one side of the center that in turn causes the chute to equalize the pull on the aviator by deflecting from the line of flight, correspondingly—this gives dirigibility to the chute.

The inclination of surface 1 is less on the side where the shrouds 7 are pulled and the resistance to the upward force of air on the downward chute is less than on the opposite side of the surface 1 is nearer flat and the resultant of the upward force of air on the descending chute will cause it to slide off in that direction, as if sliding down hill. It slides from where the resistance is less toward where it is the greatest, tilting the chute some from center.

In Figures 15 and 17 I have disclosed a modification of my pack which is substantially of the same structure as that shown in Figures 10 to 14, except that the central portion of the pack is formed of the back of the coat of the parachutist, the flaps illustrated at 17ᵃ and 18ᵃ being sewed thereto. In Figure 16 I have disclosed a tool 24 for packing my shroud lines as a rod having a forked end 25 and a handle 26. In Figure 19 I have disclosed, as a modification of my shroud line spacing means, a series of smooth rings 30 secured to each other by links 31.

In Figures 20, 26, 27, and 28 I have disclosed springs 32, and in Figure 22, springs 32ᵃ, which are sewn into the canopy, and serve the double purpose of assisting in ejecting the parachute from its container and of tending to straighten the canopy 1 out more quickly to catch the air.

Reverting now to Figure 4 and considering the same in conjunction with Figures 21, 23, 24, 25, 29, 30, 31 and 32 the operation of my control means will be seen to be as follows:

The degree of depression of the peak of the cone of the canopy 3 may be varied at will by the parachutist. As shown in Figure 1 the canopy is completely depressed and in this position the knot 31ᵃ in the line 5 is held in a hook 31ᵇ of a restraining cup holder 30ᵃ fixed on line 5, the line 5 having a sufficient extra length looped as is shown in Figure 31, and as extended in Figures 21 and 24 to permit the inner canopy 3 to assume its upper position, the means shown is just one of a large number that may be used to hold lines 5 in any position desired.

In Figure 23 canopy 3 is shown in a position intermediate of its upper and lower position relative to the canopy 1.

In Figure 25 the aviator is shown as pulling the center line 5 to the maximum thereby deflating the parachute.

In Figure 29 I have illustrated the path of the air currents between the two canopies showing their effect as deterrent to oscillation.

In Figure 30 I have disclosed the effect of the air currents between the two canopies when one of the lines 12 or 12ª is pulled showing the tilting effect produced with the consequent slippage and dirgibility of the parachute.

In Figure 18 is a modification of quick release otherwise shown in part in Figs. 12 and 17 but here showing means for making the release of the chute automatic for war use if the aviator is wounded or unconscious or if thrown from the aircraft for any reason.

The shroud lines 7, are connected to preferably a metal connection at 6ª which also has connection to concentrating lines 12 or 12ª or connections of larger size attached to the harness at either side of the body as shown in Figs. 8, 24, and 31. The ends of the supporting straps or lines 5, 12, or 12ª, as the case may be, extend from the pack, as represented at 5 in Fig. 15, and are connected externally of the pack to the harness, as shown.

Strap 22 may be used to hold straps 21 together or they may be crossed at point where 22 is placed. These straps 21 and 22 may be eliminated and the sack 15 may be riveted or secured direct to harness 9 or any modification thereof if desired.

Having thus described my invention what I claim as new and desire to secure by Letters Patent is:—

1. The combination with a parachute of a means for keeping separate the lines connected to the parachute, comprising elongated separate pockets in which loops of the connecting lines are arranged lengthwise, and a flap to cover lines exposed at said pockets.

2. The combination with a parachute of a means for keeping separate the lines connected to the parachute comprising separate pockets in which loops of the connecting lines are placed, a flap to cover lines exposed at said pockets, means for holding said flap in place over the pockets, and means for quick release of said flap when said parachute is to be used.

3. A parachute having an inverted conical shaped central part, and an annular surface shaped similar to the frustrum of a cone without a base and attached to the outer edge of the said central part, the surface of which is the smaller diametrically.

4. A parachute comprising an inner supporting surface pointing downward toward the center with means for holding the outer edge extended, and having connecting lines attached to a harness.

5. The combination with a parachute comprising an inner supporting surface pointing downward towards the center with means for holding the outer edge extended and having means for connecting to the load to be carried and means for carrying the complete outfit till needed.

6. The combination with a parachute having inner and outer supporting surfaces the inner supporting surface pointing downwards towards the center with means for holding the outer edge extended and having means for connecting to the load to be carried and means for carrying the complete outfit till needed, with means for quick and safe instant or automatic use.

7. The combination with a parachute, of means for keeping the lines separate as they lie longitudinally in loops and in use are slipped longitudinally, said parachute being contained in a flexible sack that may be placed on the body of the aviator; said sack having a removable restraining device one end of which is attached to an air craft.

8. The combination with a parachute of a harness connected to the upper part of the body and having means connected to the lower part of body and means to be disconnected from said lower part of body and chute remaining in complete use.

9. The combination with a parachute of means for keeping separate the lines connected to the parachute, comprising separate pockets for different parts of the same line; one end of said connecting lines being detachably connected to the upper end only of a body harness; said body harness having detachable means for connecting to a foot covering.

10. The combination with a parachute of means for keeping separate the lines connected to the parachute, comprising means for paying out certain lengths of lines in a series of small jerks on the aviator to check his velocity gradually, as the parachute opens gradually, said lines being connected to harness that has straps extending to the lower part of the body, said straps having means for releasable connection with other straps on said lower part of body.

11. A parachute comprising inner and outer supporting surfaces having an opening between, and means to vary the position of the outer surface and to constrict said opening.

12. A parachute comprising an inner supporting surface normally pointing downward at the center with means for holding the outer edge extended comprising an outer surface pointing inward and upward, said two surfaces being connected respectively at their largest diameters to each other.

13. A parachute comprising an inner supporting surface pointing downward towards the center with means for holding the outer edge extended comprising an outer surface pointing inward and upward and having connecting lines attached to a harness and having means for changing the relative angles of these two surfaces towards each other by hauling on selected lines connected thereto directly or indirectly.

14. A parachute comprising an inner and an outer part and with an air vent therebetween, and means for letting more air pass between said parts at one chosen location than between the remainder of the division between said inner and outer parts.

15. The combination with a parachute of connecting lines, means for keeping the said lines separate comprising pockets from which the said lines are withdrawn against variable retarding friction, one end of said lines being detachably connected only to the upper end of a body harness having straps extending to the feet.

16. A parachute comprising upper and lower separate supporting surfaces, the lower surface increasing in diametrical width from the bottom to the upper end when in normal use, and the other surface being larger at the bottom and decreasing in diametrical width from the bottom upward.

17. A parachute comprising an inner supporting surface tapering to a point at the center with means for holding the outer edge extended, and an outer annular ring having connecting lines attached to a harness, said lines furnishing a means to make any set of said lines relatively shorter by hauling in on said lines through said means thereby causing a distortion in the outer annular ring relative to the inner supporting surface.

18. In a parachute of the type flying entirely above the aviator a harness for connecting the same to the user, a part of which harness comprises a foot covering, said covering having means for detachably securing the harness thereto.

19. A parachute comprising upper and lower separate supporting surfaces, the lower increasing in diametrical width from the bottom to the upper end when in normal use and the upper surface being larger at the bottom and decreasing in cross width from the bottom upward and the largest cross width of the said lower surface being larger than the smallest cross width of the said upper surface but not as large as largest cross width of said upper surface.

20. The combination with a parachute having a harness to connect to the user, a container for keeping said parachute in a folded condition, said container kept closed by a multiplicity of fastenings including a pin, one end only of which is adapted to be connected to an air craft for withdrawing said pin from said container and automatically releasing said parachute, upon descent of user.

21. The combination with a parachute having a harness to connect to user, a container for keeping said parachute in a folded condition, said container having a single fastener to restrain said container at a multiplicity of places, one end of said fastener being adapted to be connected to an air craft for withdrawing said fastener from said container and automatically releasing said parachute upon descent of user.

22. In combination with a parachute having connecting lines, a spacing line connecting said lines above their lower ends, auxiliary lines arranged to produce deflection in selected segments of the parachute periphery by being connected to said spacing and connecting lines, said auxiliary lines extending to within handy reach of the user.

23. In a life preserver for aviators, a parachute having an inverted conical central part and an outer part spaced therefrom, and means for converting said parts into a unitary approximate semispherical shaped parachute.

24. A parachute comprising inner and outer supporting surfaces having an opening between and means to vary the relative position of the two surfaces and to constrict or enlarge said opening.

25. A parachute comprising inner and outer supporting surfaces having an opening between and means to vary the relative position of the two surfaces and to constrict or enlarge said opening comprising manually operated lines attached to one of the surfaces.

26. In a parachute, inner and outer supporting surfaces, and means to move the outer surface towards, up to and away from the inner.

27. A parachute having an inverted many sided pyramidal shaped central part, an annular surface shaped similar to the frustrum of a many sided pyramidal shaped surface and attached to the outer edge of the central part, the apex of said central part being variably held in position by a single control line.

28. A parachute comprising an inner supporting surface normally pointing downward at the center, with means for holding the outer edge extended comprising an outer surface pointing inward and upward, said two surfaces being connected respectively at their largest diameters to each other, the largest circumference of said outer surface and the apex of said inner having means operatively connected to the user.

29. A parachute comprising an inner supporting surface normally pointing downward at the center, with means for holding the outer edge extended comprising an outer surface pointing inward and upward, said two surfaces being connected respectively at their largest diameters to each other, the apex of said inner surface having connected therewith a single control line of variable length.

30. A parachute comprising inner and outer normally separate supporting surfaces, the cross width of the inner surface increasing in diameter progressing uniformly from the vertex, and the other said surface decreasing in diametrical cross width from the bottom upward, the said bottom of the outer surface being connected to user and the said vertex of the inner surface having a single control line of variable length connected therewith.

31. A parachute having a normally inverted conical shaped central part and an annular surface shaped similar to the frustrum of a cone without a base and attached to the outer edge of the central part, said central part having its apex detachably connected to a harness connected to the user, said user being able to vary the length of said connection to user.

32. A parachute comprising inner and outer supporting surfaces, said inner surface having an apex to which a single control line of variable length is connected, the largest diameter of said outer surface being connected to user by lines of variable lengths subject to control by the user, said surfaces being connected at their largest circumferences to each other.

33. The combination with a parachute having a harness to connect to the user, a container for keeping said parachute in a folded condition, said container kept closed by a multiplicity of fastenings including a pin, one end only of which is adapted to be connected to an airplane for withdrawing said pin from said container and automatically releasing said parachute.

34. A parachute having a harness adapted to be connected to the user a container kept closed by a multiplicity of fastenings, including a pin the lower end of which is flexible the other end of which is adapted to be connected detachably to an aircraft, said pin being withdrawn upon descent of user.

35. A parachute having a harness adapted to be connected to the user, a flexible parachute enclosing container kept closed by a multiplicity of fastenings, including a releasing pin one end of which is manipulated for the withdrawal of said pin for releasing the parachute.

36. A parachute having a harness adapted to be connected to the user a flexible container kept closed by a multiplicity of fastenings, including a flexible releasing pin one end of which has means attached for withdrawing said pin and releasing the parachute.

37. In combination, a parachute folded into a compact mass, a container for the folded parachute having a plurality of flexible flaps adapted to form a closure for the container, and fastening means for releasably holding the edges of said flaps together, said means comprising projecting means on one of said flaps having transverse openings therethrough, apertures in the other of said flaps through which said projecting means are adapted to extend, and releasable restraining means adapted to be inserted through said transverse openings.

38. A container for a folded parachute comprising a plurality of flaps adapted to overlap each other when folded inwardly to close the container, some of said flaps having projecting means having apertures therethrough, other of the flaps having eyes adapted to receive said projecting means, and pins passing detachably through said apertures in said projecting means to hold said eyes thereon.

39. In a parachute pack, a parachute having shroud lines, a container of flexible material adapted to be folded about said parachute, and pockets in said container for tucking said shroud lines in packing said parachute in said container.

40. In a parachute pack, a parachute and shroud lines, a container of flexible material having a central portion of approximately rectangular pattern, a plurality of pockets in said rectangular portion for releasably receiving and holding said shroud lines, a plurality of flaps on said rectangular portion adapted to be folded about said parachute, releasable means for holding said flaps in folded position, and means for releasing said holding means.

41. In a parachute pack, a parachute, a container having flaps to fold over the same and retain the parachute between them and the back of the container, and pockets in said back to receive looped ends of the shrouds of said parachute in orderly non-tangling arrangement, the canopy of said parachute being folded and packed over the pockets containing said shrouds and out of danger of entanglement therewith.

42. In a parachute pack, a container, a parachute packed therein having shroud lines, and spaced pockets in said container having the shroud lines bunched together and laid back and forth and held in zig-zag position in said pockets.

43. In a parachute pack, a container comprising a back and flaps releasably held in position overlying the back to retain a parachute, a parachute having shroud lines and folded in said pack, and a plurality of substantially parallel pockets in the back portion of said container for receiving looped portions of the bundles of parachute shroud lines, with said parachute folded and laid over the same.

44. In a parachute pack, a container, a parachute packed therein having shroud lines, and pieces of flexible material secured in said container at spaced intervals to form essentially parallel pockets to receive looped bundles of said shroud lines.

45. In combination, in a parachute pack, flexible fabric material including a substantially rectangular back and four flaps to be folded about a parachute and its shroud lines and held releasably, pockets in said back permitting an orderly non-entangling arrangement and packing of looped ends of the shroud lines of said parachute, the canopy of said parachute being folded and packed over the pockets containing said shroud lines and out of danger of entanglement therewith, releasable holding means for holding said flaps in folded position, and means for releasing said holding means.

46. In combination, in a parachute pack, flexible fabric material including a substantially rectangular back and four flaps to be folded about a parachute and its shroud lines and held releasably, substantially parallel pockets in said back permitting an orderly non-tangling arrangement and packing of looped ends of the shroud lines of said parachute, the canopy of said parachute being folded and packed over the pockets containing said shroud lines and out of danger of entanglement therewith, releasable holding means for holding said flaps to folded position, and means for releasing said holding means.

47. In a parachute pack, a container comprising a back and flaps releasably held in position overlying the back to retain a parachute, a plurality of projecting holding means in one of said flaps each having an aperture therethrough, eyelets on said other flaps through which said projecting holding means are adapted to be extended, releasable means adapted to be inserted through said apertures to hold the parachute and pack in folded condition, means to enable releasing of said last mentioned means, a parachute having shroud lines folded in said pack, and a plurality of substantially parallel pockets in the back portion of said container for receiving looped portions of the bundles of said parachute shroud lines with said parachute folded and laid over the same.

48. In a parachute pack, a container, a parachute packed therein having shroud lines, and pieces of flexible material secured in said container at spaced intervals to form essentially parallel restraining means to hold releasably looped bundles of said shroud lines.

49. A container for a folded parachute comprising a plurality of flaps adapted to overlap one another when folded inwardly to close the container, some of said flaps having projecting means having apertures therethrough, other of the flaps having eyes adapted to receive said projecting means, and pins passing detachably through said apertures in said projecting means to hold said eyes thereon, and part of said flaps being cut on a bias angle thereby having means to prevent slackness in the edge and to make flap tight, with less connections.

50. A container for a folded parachute comprising a plurality of flaps adapted to overlap one another when folded inwardly to close the container, some of said flaps having projecting means having apertures therethrough, other of the flaps having eyes adapted to receive said projecting means, and pin means passing detachably through said apertures in said projecting means to hold said eyes thereon, the outermost of said flaps having an edge cut on bias angle.

51. A parachute pack embodying a sheet of flexible material adapted to be folded about a parachute, and releasable means for holding the enfolding parts of the material in folded position, said means embodying means having eyelets therein fixed on one folded part and projecting through apertures in another folded part, and a pin extending through the eyelets, a part of pack releasing means having means of being securable as and where desired.

52. The combination with a parachute, shroud lines for said parachute, containing means for releasably packing said parachute and shroud lines including separate pockets for keeping different parts of the same lines in different pockets, a body harness, means for connecting the lower ends of said lines to said harness, said harness having a shoulder strap, a body belt, said shoulder strap being connected to said belt, said belt having means for quick connection or disconnection from supporting means arranged to engage the lower part of the body of a user.

53. A parachute comprising inner and outer supporting surfaces, said outer supporting surface being provided with an opening, and means for varying the relative spaced positions of said surfaces and for permitting said inner surface to move adjacent said opening in contact with the outer surface in position to close said opening.

54. A parachute comprising inner and outer supporting surfaces, said outer surface being provided with a central opening for permitting egress of air therethrough when in use, said inner surface being supported below and adjacent said opening, and means for permitting relative movement between said surfaces, whereby said inner surface may contact said upper supporting surface and prevent the flow of air through said opening.

55. In a parachute, an upper supporting surface and a lower supporting surface, said surfaces having all stresses in tension only when in use, said upper surface having an opening therethrough, a portion of said lower surface being movable from a position below said upper surface, through said opening to a position above said upper surface.

56. A parachute pack comprising a folded parachute and a container therefor, said container having a back portion and a flexible closure portion foldable over said parachute for releasably retaining the parachute therein, shroud lines for said parachute, said lines being packed in parallel relation and folded back and forth in loops in contact with said back portion, means for releasably holding said closure portion folded about said parachute, and means for releasing said holding means, said first named means being operable by a pull on said last named means.

57. A parachute pack comprising a parachute and a container therefor, said container comprising a back portion and laterally extending flexible portions adapted to be folded over said parachute, means for releasably holding said flexible portions comprising means on one lateral portion interengaging means on another lateral portion, and means for releasing said holding means, said first named means being operable by a pull on said last named means.

58. In a parachute pack, a flexible container, a releasable flexible closure for said container, a parachute packed therein, the fabric of said parachute being folded back and forth in transverse loops with the peak of the parachute outermost, means for releasing said closure, and means rendered operable by release of said closure for causing said parachute to issue peak first from said container, said last named means comprising elastic means associated with the fabric of said parachute.

59. In a parachute pack, a container, a releasable closure for said container, the fabric of said parachute being folded back and forth in transverse loops with the peak of the parachute adjacent said closure, shroud lines for said parachute, pockets for releasably retaining said lines in zig-zag looped formation in said container, means for releasing said closure, and means for assisting said parachute to issue peak first from said container.

60. In a parachute pack, a parachute and a container therefor comprising a back portion and a flexible closure portion adapted to releasably enclose said parachute, shroud lines for said parachute, said lines being arranged on said back portion in transverse looped bundle lying in substantially the same plane on said back portion, means for releasably retaining said loops on said back portion, said parachute being folded back and forth in transverse layers with the peak end adjacent said flexble closure portion, means for releasably retaining said flexible closure portion, and means to assist said parachute to issue peak first upon release of said retaining means.

61. In a packed parachute in combination, a parachute, a body harness, shroud lines attached at one end to said parachute and at their other ends to said harness, a container for said parachute and associated with said harness, said container having a back portion, said lines being arranged in parallel relation in contact with said back portion and looped back and forth in zig-zag formation, said parachute being supported in folded relation in said container in position over said looped lines, the folds of said parachute lying one upon the other and extending transversely of said container, said container being provided with a laterally extending portion adapted to be folded over said parachute, the peak of said folded parachute lying adjacent said last named portion.

62. In a packed parachute in combination, a parachute, a body harness, shroud lines attached at one end to said parachute and at their other ends to said harness, a container for said parachute and associated with said harness, said container having a back portion, said lines being arranged in parallel relation in contact with said back portion and looped back and forth in zig-zag formation, said parachute being supported in folded relation in said container in position over said looped lines, the folds of said parachute lying one upon the other and extending transversely of said container, said container being provided with a laterally extending portion adapted to be folded over said parachute, the peak of said folded parachute lying adjacent said last named portion, means for releasably retaining said lateral portion in position over said parachute, and means for releasing said retaining means.

63. In a packed parachute in combination, a parachute, a body harness, shroud lines attached at one end to said parachute and at their other ends to said harness, a container for said parachute and associated with said harness, said container having a back portion, said lines being arranged in parallel relation in contact with said back portion and looped back and forth in zig-zag formation, said parachute being supported in folded relation in said container in position over said looped lines, the folds of said parachute lying one upon the other and extending transversely of said container, said container being provided with a laterally extending portion adapted to be folded over said parachute, the peak of said folded parachute lying adjacent said last named portion, and means for releasably retaining said looped shroud lines in position on said back portion whereby to permit the looped lines to issue from said container in succession.

64. In a parachute pack, a container, supporting harness straps extending from said container, a parachute packed therein having shrouds connected to said straps, and pockets in said container for tucking said shrouds in in packing said parachute.

65. In combination a parachute pack including a parachute packed therein, shroud lines connected therewith and releasably packed therein, and an aviator's harness including an upper portion releasably connected with the upper part of the body of the aviator, and straps connected with said upper portion having means for releasable connection with foot coverings to be worn by the aviator.

66. In parachute apparatus, the combination of a removable body harness having means for releasable securement to the upper part of the body and legs of a wearer, and a detachable parachute pack including a container releasably housing a packed parachute and releasably folded shroud lines therein, means to quickly open the container to release the parachute and shroud lines, and supporting lines having connection with the shroud lines and externally of the pack having connection with the upper part of said harness.

67. In parachute apparatus the combination of a removable body harness having means for releasable securement to the upper part of the body and legs of a wearer, a parachute pack including a container releasably housing a packed parachute and releasably folded shroud lines therein, means to detachably connect the parachute pack to a wearer independent of the harness for carrying purposes, means to quickly open the container to release the parachute and shroud lines from the container, and supporting lines having connection with the shroud lines and externally of the pack having connection with the upper part of said harness.

68. In a parachute pack the combination of a flexible container adapted to receive a compactly folded parachute releasably therein, said container including a plurality of parts which are connectible to enclose the parachute to form a pack, a plurality of fastening devices cooperatively mounted upon said parts, and a flexible wire rip cord for releasably connecting said fastener parts for releasably closing the container.

69. In a parachute pack the combination of a flexible fabric container including a plurality of parts for enclosing a compactly folded parachute therein, said parts being adapted to overlap at their marginal edges when the container is closed, a plurality of fastening devices interengageably mounted upon said parts comprising transversely apertured studs mounted on one of the parts and the other part having eyelets thereon for receiving said studs therein, and a flexible wire releasing cord releasably engageable through the transversely apertured studs for holding the latter assembled in said eyelets to releasably close the container.

70. In combination with a parachute including shroud lines, a container for the parachute and shroud lines of flexible material, a removable restraining device for releasably holding said container closed, and means in the container for releasably holding the shroud lines in a frictionally retained zig-zag pocketed relation.

71. In a parachute pack, in combination, a parachute canopy, shroud lines attached at an end of said parachute canopy, a container for said parachute canopy having a back portion, said lines being arranged in parallel lengths in substantially a single layer upon the back of the container, said parachute being supported in folded relation in said container in position over said lines in a piled relation with the folds of said parachute line one upon the other and extending transverse to the plane of the layer of said folded shroud lines, and means to open the container and release the parachute and shroud lines.

72. In parachute apparatus a container of flexible material, releasing means to open the container, a packed parachute within the container, shroud lines connected with the parachute, and pocket means in the container free of connection and independent of the parachute for releasably stowing the shroud lines in a zig-zagged substantially parallel relation so that they may issue from the container without twisting.

73. In a parachute pack, the combination of a container including a wall adapted to be worn next to the body of a user and a flexible closure means associated with said wall to provide an enclosure, a parachute having shroud lines bunched together in non-tangled relation and folded zig-zag within the container back and forth in a plane parallel to the plane of said wall so that when issuing from the container they will be free of twists, said parachute being folded back and forth in an orderly zig-zag relation piled upon said folded shroud lines in a direction transverse to said wall, means to open the closure means to release the parachute and shroud lines, and a body attaching harness operatively associated with the parachute.

74. In a parachute pack, the combination of a container including a wall adapted to be worn next to the body of a user and flexible closure means associated with said wall to provide an enclosure, a parachute having shroud lines bunched together in non-tangled substantially parallel relation, substantially parallel shroud line retaining pockets in said container next to said wall wherein the shroud lines in said bunched relation are folded zig-zag back and forth in a plane parallel to the plane of said wall, said parachute being folded back and forth in an orderly zig-zag relation upon said folded shroud lines, piled in a direction transverse to said wall, means to open the closure means to release the parachute and shroud lines, and a body attaching harness operatively associated with the parachute and shroud lines.

75. In parachute apparatus, a container, a parachute packed in the container, shroud lines attached to the parachute and bunched in parallel relation and folded zig-zag in side by side lengths in the container in a plane transverse to the line at which the parachute issues from the container, and means to open the container to permit the parachute and shroud lines to exit therefrom.

76. In a parachute pack the combination of a container, substantially parallel shroud line retaining pockets in the container, a parachute packed in the container, and shroud lines attached to the parachute and bunched in parallel relation and folded in their bunched relation zig-zag back and forth in side by side lengths tucked in said pockets in a layer disposed in a plane transverse to the line at which the parachute issues from the container, and means to release the container to permit the parachute and shroud lines to issue therefrom during operation.

77. A parachute pack embodying a container of flexible material adapted to be folded about a parachute to enclose it, and means for releasably holding the enfolding parts of the material in parachute enclosing position, said means including stud means fixed on one part and projecting through an apertured portion of another part, and a pin releasably fastened to said stud means to hold the container parts together.

78. A parachute pack embodying a container of flexible material adapted to be folded about a parachute, and releasable means for holding the enfolding parts of the material in folded position, said means embodying transversely apertured studs which slope convergently towards their outer ends and are fixed on one folded part and projected through eyelets in another folded part, and a pin extending releasably through the apertures in said studs and having a handle at an end thereof.

79. The combination with a parachute and its shroud lines, of means for keeping the shroud lines packed in an orderly arrangement consisting of a series of rings receiving the respective shroud lines in zig-zag relation from one ring to another in movably placed relation therein.

80. The combination with a parachute and its shroud lines, of means for keeping the shroud lines packed in an orderly arrangement consisting of a series of adjacently-disposed loops with said lines folded zig-zag and removably held with their bight end portions within said loops to facilitate release of the parachute.

In testimony whereof I affix my signature.
HERBERT L. ADAMS.

CERTIFICATE OF CORRECTION.

Patent No. 1,780,104.  October 28, 1930.

HERBERT L. ADAMS.

It is hereby certified that error appears in the printed specification of the above numbered patent requiring correction as follows: Page 4, line 62, for "line" read "lie in"; page 10, line 90, claim 71, for "line" read "lying"; and that the said Letters Patent should be read with these corrections therein that the same may conform to the record of the case in the Patent Office.

Signed and sealed this 27th day of December, A. D. 1932.

(Seal)

M. J. Moore,
Acting Commissioner of Patents.